Dec. 9, 1952 J. J. DIGBY 2,620,671
ENGINE STARTER DRIVE
Filed Oct. 17, 1951
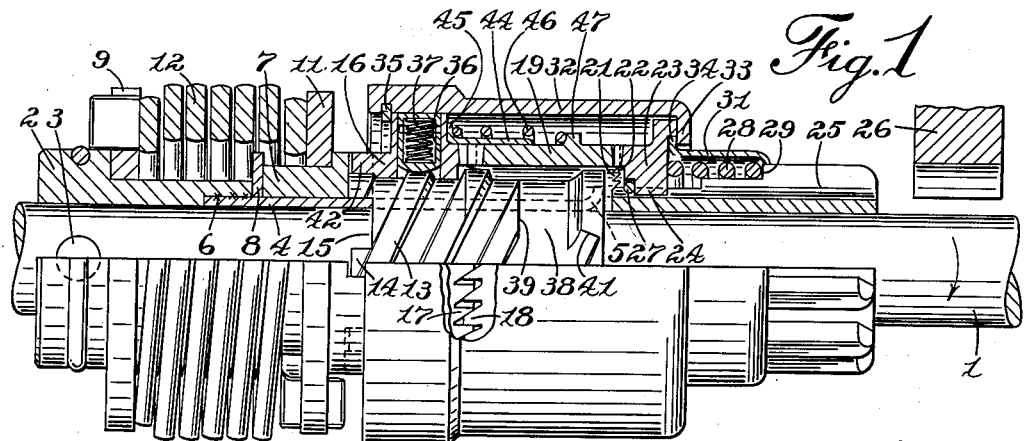
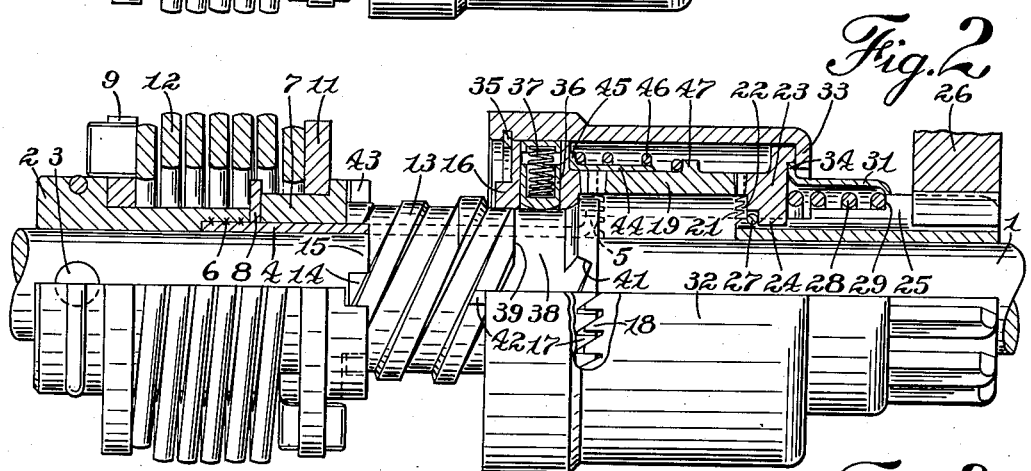
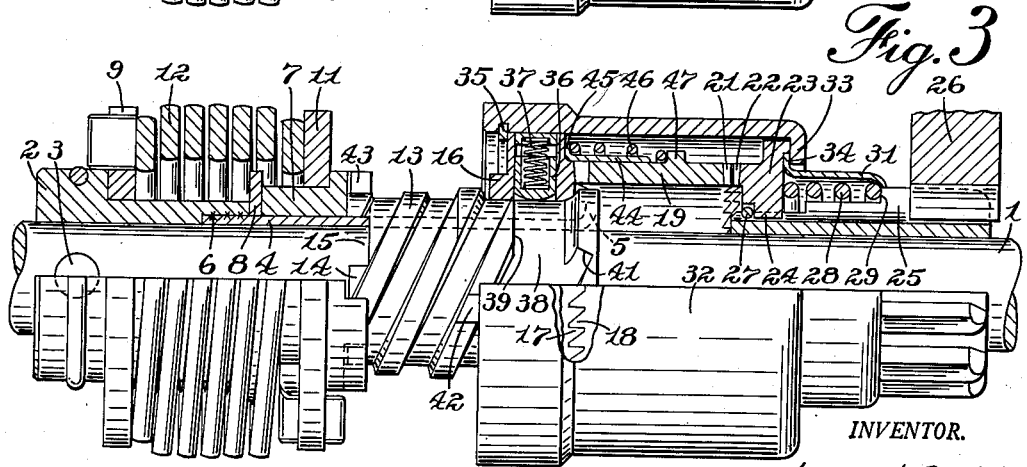
WITNESS:
Esther M. Stockton
INVENTOR.
James J. Digby
BY Clinton S. James
ATTORNEY

UNITED STATES PATENT OFFICE 2,620,671

ENGINE STARTER DRIVE

James J. Digby, Elmira, N. Y., assignor to Bendix Aviation Corporation, a corporation of Delaware Application October 17, 1951, Serial No. 251,771

3 Claims. (Cl. 74—7)

The present invention relates to an engine starter drive and more particularly to starter gearing of the automatically traversing type having "anti-kickout" or "follow-through" characteristics.

It is an object of the present invention to provide a novel engine starter drive which is self-contained in that it requires no external stop for the pinion, and which is small and compact in comparison with standard forms of drives having like torque capacity.

It is another object to provide such a device incorporating a dental type of overrunning clutch, with cam means for compressing the clutch members during cranking.

Further objects and advantages will be apparent from the following description taken in connection with the accompanying drawing in which:

Fig. 1 is a side elevation partly broken away and in section, showing a preferred embodiment of the invention with the parts in idle position;

Fig. 2 is a view similar to Fig. 1 showing the parts in cranking position; and

Fig. 3 is a similar view showing the parts in the positions assumed when the engine becomes self-operative while the drive pinion is held in mesh with the engine ring gear.

In Fig. 1 of the drawing there is illustrated a power shaft 1 on which a driving head 2 is fixedly mounted by any suitable means as indicated at 3. A sleeve 4 having a terminal flange 5 is rigidly mounted in a counterbore of the driving head 2 as by means of brazing as indicated at 6, and a driven head 7 is journaled on the sleeve, preferably separated from the driving head by a thrust washer 8.

Means for yieldingly connecting the driving and driven heads is provided comprising anchor plates 9 and 11 and non-rotatably mounted on the driving and driven heads respectively and connected by torsion spring 12, the ends of which are hooked into slots in the anchor plates.

A screw shaft 13 is mounted on the flanged sleeve 4 adjacent to the driven head 7, and is coupled to the driven head by means of interengaging projections 14, 15, which are maintained in engagement by the flange 5 of sleeve 4, which flange is formed after assembly of the screw shaft on the sleeve.

A control nut 16 is threaded on the screw shaft and is provided with inclined coupling teeth 17 adapted to cooperate with similar teeth 18 on a cylindrical transmission member 19 which is rotatably mounted on the screw shaft. Transmission member 19 has overrunning clutch teeth 21 which cooperate with similar teeth 22 on a driven overrunning clutch member 23 which is splined as indicated at 24 on the extended hub of a pinion 25 journaled on the power shaft 1 and moveable thereon into and out of engagement with an engine gear 26. The driven clutch member 23 is retained on the pinion hub by a split lock 27, against which the clutch member is pressed by a mesh-enforcing spring 28 bearing against the clutch member and a shoulder 29 on the pinion. The spring and splined connection are preferably enclosed by a sleeve 31 which is slidable on the pinion.

A barrel member 32 is mounted on the control nut 16 and driven clutch member 23, and is provided with a flange 33 at one end which bears against the driven clutch member 23 and also against a flange 34 on the sleeve 31. A lock ring 35 is located in the opposite end of the barrel 32 and bears against the control nut 16 so as to limit longitudinal movement of the control nut, transmission member 19 and driven clutch member 23. Torque transmitted from the control nut through these associated parts thus causes the wedging action of the inclined teeth 17, 18 to compress the overrunning clutch teeth 21, 22.

A detent member 36 is mounted in the control nut 16 for radial sliding movement, and a spring 37 normally urges the detent against the surface of the screw shaft 13. The screw shaft is provided with a portion 38 of reduced diameter adjacent the position of the detent when the pinion is meshed with the engine ring gear. The shoulder 39 so formed on the screw shaft cooperates with the detent to resist demeshing movement of the pinion until the pressure of the detent against the screw shaft is relieved by centrifugal force caused by rapid rotation of the control nut.

In order to define the meshing position of the pinion 25, the travel of the control nut 16 on the screw shaft 13 is arrested by means of abutments 41 formed on the abrupt termination of the thread grooves in the screw shaft. The longitudinal movement of the control nut in the demeshing direction is arrested by engagement of a lug 42 on the control nut with a back stop 43 formed on the driven head 7.

A ring 44 having a flange 45 is loosely mounted on the control nut and transmission member so as to enclose the inclined teeth 17, 18, and a light compression spring 46 bearing at one end against the flange 45 and at its other end against a rib 47 on the transmission member serves to normally maintain the clutch teeth 21, 22 in engagement.

In operation, and starting with the parts in the positions illustrated in Fig. 1, rotation of the power shaft 1 in the direction of the arrow causes the control nut 16 with the barrel 32 and associated parts to be traversed to the right in Fig. 1 until the pinion 25 is meshed with the engine gear 26, at which time the meshing movement is stopped by the engagement of the control nut with the abutments 41 on the screw shaft 13, whereupon the pinion is rotated to crank the engine, the application of the load being cushioned by the torsion spring 12.

During cranking, the camming action of the inclined teeth 17, 18 forces the overrunning clutch teeth 21, 22 tightly together so as to form a rigid driving connection. When the engine starts, the acceleration of the pinion 25 relieves the pressure of the cam teeth, permitting the pinion and clutch member 23 to overrun the transmission member 19.

Demeshing of the pinion from the engine gear 26 is at first prevented by engagement of the detent 36 with the shoulder 39 on the screw shaft, so that if the engine does not remain self-operative, the clutch teeth 21, 22 will be reengaged by the spring 46 and cranking resumed. When the engine continues self-operative, the acceleration of the control nut by the starting motor, and by the torque transmitted back from the overrunning pinion, causes the detent 36 to be withdrawn by centrifugal force, permitting the parts to be returned to idle position by the torque from the pinion as controlled by the clutch spring 46.

Although but one embodiment of the invention has been shown and described in detail, it will be understood that various changes may be made in the precise design and arrangement of the parts without departing from the spirit of the invention.

I claim:
1. In an engine starter drive, a power shaft, a driving head fixed thereon, a flanged sleeve on the shaft rigidly attached at one end to the driving head, a driven head journaled on the sleeve, means including a torsion spring yieldingly connecting the driving and driven heads, a screw shaft mounted on the sleeve having a positive coupling connection with the driven head which is maintained by the engagement of the flange on the sleeve with the free end of the screw shaft; a control nut on the screw shaft having inclined coupling teeth, a cylindrical transmission member having similar coupling teeth at one end cooperating with those of the control nut, and having overrunning clutch teeth on its other end; a pinion slidably journaled on the power shaft for driving engagement with an engine gear, a driven overrunning clutch member splined on the pinion, and means including a barrel member enclosing the control nut, transmission member and clutch member and limiting their relative longitudinal movement, so that the wedging action of the inclined coupling teeth compresses the overrunning clutch connection.

2. An engine starter drive as set forth in claim 1 in which the threads of the screw shaft terminate abruptly to form abutments which arrest the meshing movement of the control nut.

3. An engine starter drive as set forth in claim 1 including further a detent mounted in the control nut for radial movement, a spring normally urging the detent into engagement with the screw shaft, said screw shaft having a shoulder in position to be engaged by the detent to oppose demeshing movement of the control nut.

JAMES J. DIGBY.

No references cited.